(12) United States Patent
Peter

(10) Patent No.: US 9,906,292 B2
(45) Date of Patent: Feb. 27, 2018

(54) MULTIPLE ORDER CONNECTORS FOR CONTACTLESS COMMUNICATION DEVICES AND METHODS FOR USING THE SAME

(71) Applicant: Keyssa Systems, Inc., Campbell, CA (US)

(72) Inventor: Ajith Roy Peter, Fremont, CA (US)

(73) Assignee: KEYSSA SYSTEMS, INC., Campbell, CA (US)

( * ) Notice: Subject to any disclaimer, the term of this patent is extended or adjusted under 35 U.S.C. 154(b) by 0 days.

(21) Appl. No.: 15/162,313

(22) Filed: May 23, 2016

(65) Prior Publication Data

US 2017/0338885 A1 Nov. 23, 2017

(51) Int. Cl.
*H04B 5/00* (2006.01)
*H04B 7/24* (2006.01)

(52) U.S. Cl.
CPC ........................... *H04B 7/24* (2013.01)

(58) Field of Classification Search
None
See application file for complete search history.

(56) References Cited

U.S. PATENT DOCUMENTS

| | | | |
|---|---|---|---|
| 5,810,614 A * | 9/1998 | Ruch | H01R 13/629 439/247 |
| 7,346,242 B2 | 3/2008 | Morlion et al. | |
| 8,288,877 B1 * | 10/2012 | Brewer | H01L 23/544 257/797 |
| 8,794,983 B2 | 8/2014 | Liu | |
| 2004/0041998 A1 * | 3/2004 | Haddad | G06K 9/00033 356/71 |
| 2006/0051981 A1 | 3/2006 | Neidlein et al. | |
| 2006/0159295 A1 * | 7/2006 | Onishi | H04R 17/00 381/190 |
| 2009/0047824 A1 | 2/2009 | Seibert et al. | |
| 2010/0309369 A1 * | 12/2010 | Jarvis | H04N 5/2254 348/371 |
| 2012/0083137 A1 | 5/2012 | Rohrbach et al. | |
| 2013/0157729 A1 * | 6/2013 | Tabe | H04W 52/0245 455/573 |
| 2014/0120746 A1 | 5/2014 | Persion et al. | |

(Continued)

*Primary Examiner* — Ankur Jain
*Assistant Examiner* — Max Mathew
(74) *Attorney, Agent, or Firm* — Van Court & Aldridge LLP

(57) ABSTRACT

Multiple order connectors for contactless communication devices and methods for using the same are disclosed herein. In some embodiments, a first device for use in establishing a contactless communications link with a second device is provided. The first device can include a first order connection, which can be constructed to interface with a counterpart first order connection of the second device, and a second order connection. The second order connection can include a substrate, at least one contactless communications unit (CCU) mounted on the substrate and that is operative to establish the contactless communications link with a respective counterpart CCU of the second device, and an actuator operative to move the substrate such that the at least one CCU is optimally aligned with its respective counterpart CCU to establish the contactless communications link.

20 Claims, 13 Drawing Sheets

(56) References Cited

U.S. PATENT DOCUMENTS

| | | | |
|---|---|---|---|
| 2014/0281534 A1* | 9/2014 | McCormack | H04L 63/0428 713/168 |
| 2014/0378058 A1* | 12/2014 | Decuir | H04W 4/008 455/41.2 |
| 2016/0106370 A1* | 4/2016 | Filipovic | H04B 1/3888 340/870.07 |
| 2016/0119168 A1* | 4/2016 | Roy | H04L 25/4902 375/238 |
| 2016/0142867 A1* | 5/2016 | Kim | H02J 7/025 455/41.1 |
| 2016/0182707 A1* | 6/2016 | Gabel | H04M 1/72541 455/404.2 |
| 2016/0323012 A1* | 11/2016 | Kwon | H04B 1/7143 |
| 2016/0349842 A1* | 12/2016 | Sills | G06F 3/016 |
| 2016/0359525 A1* | 12/2016 | Griffin | H04B 5/0031 |

* cited by examiner

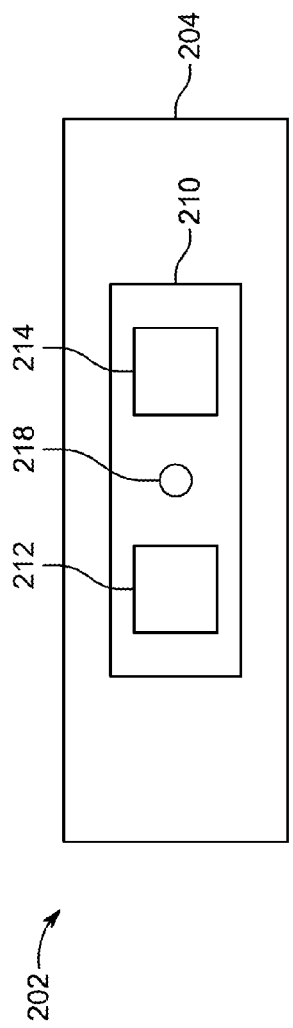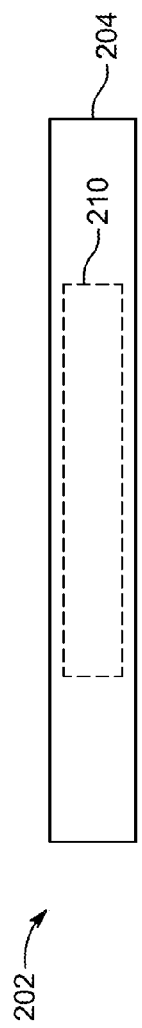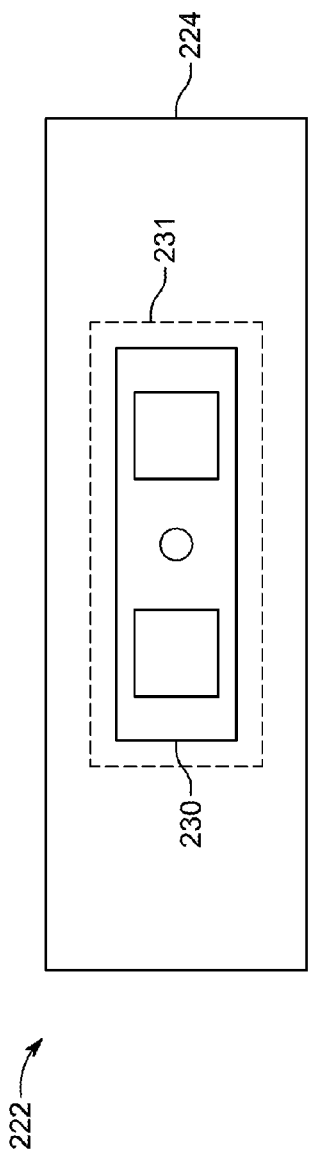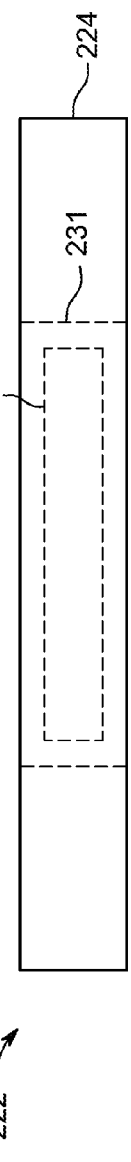

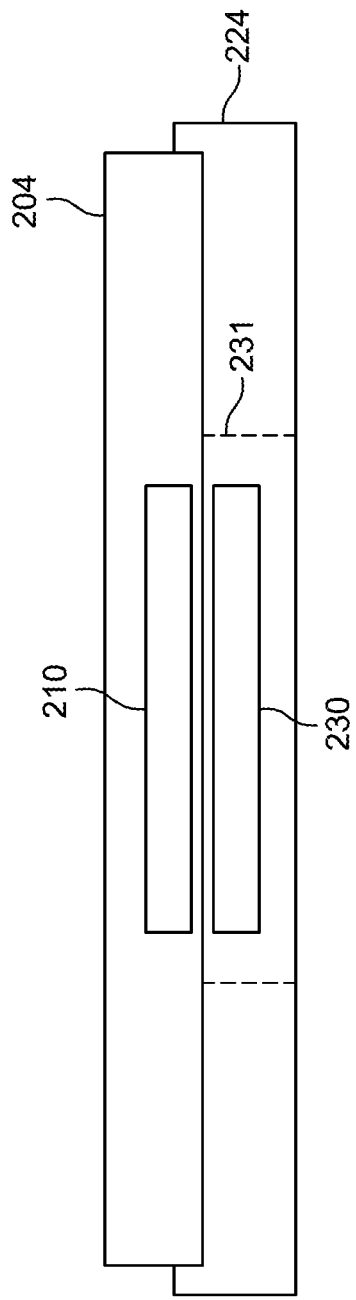

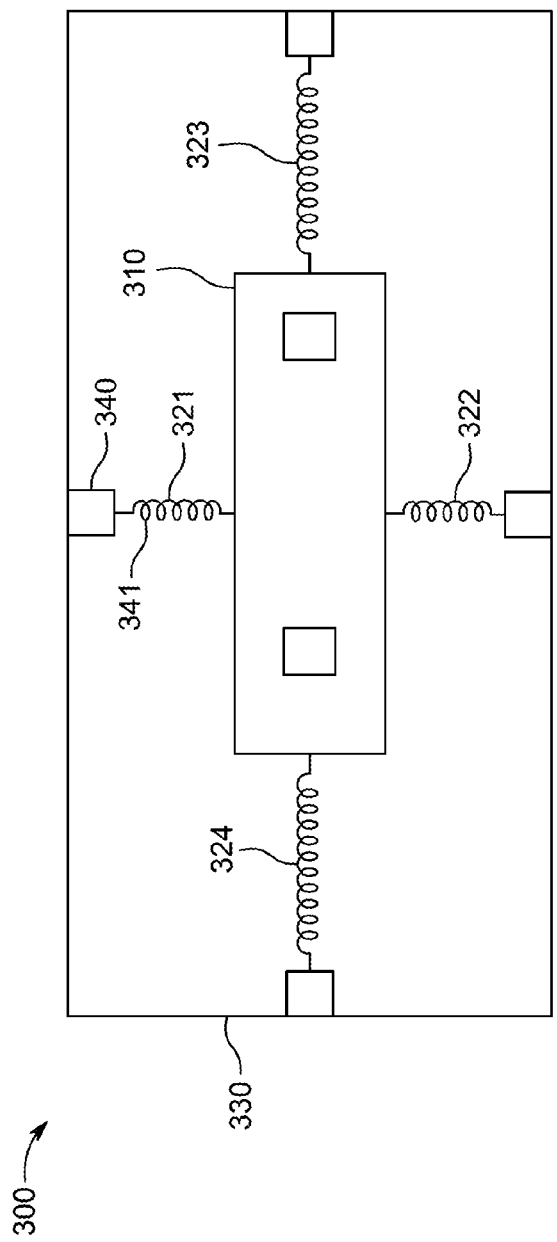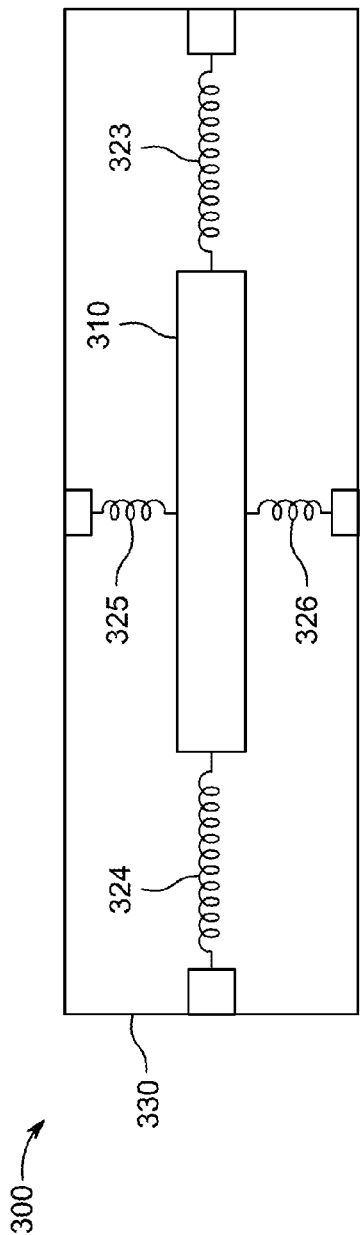
FIG. 3A
FIG. 3B

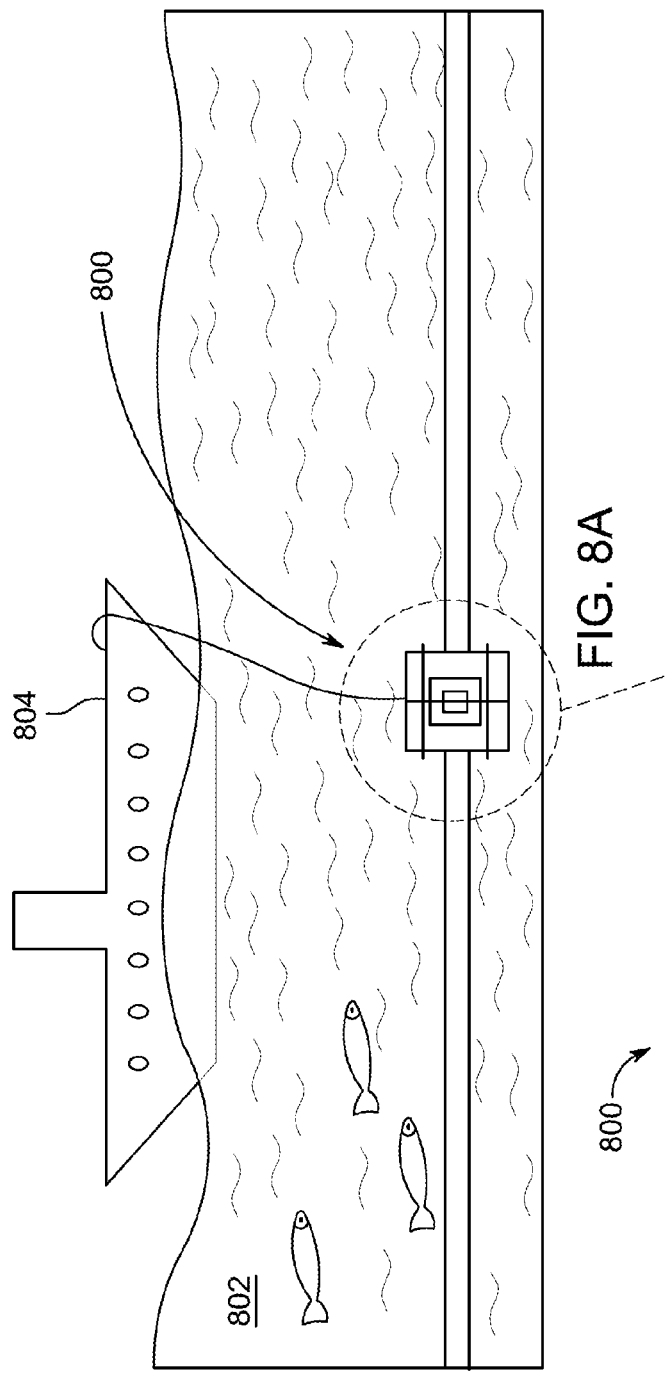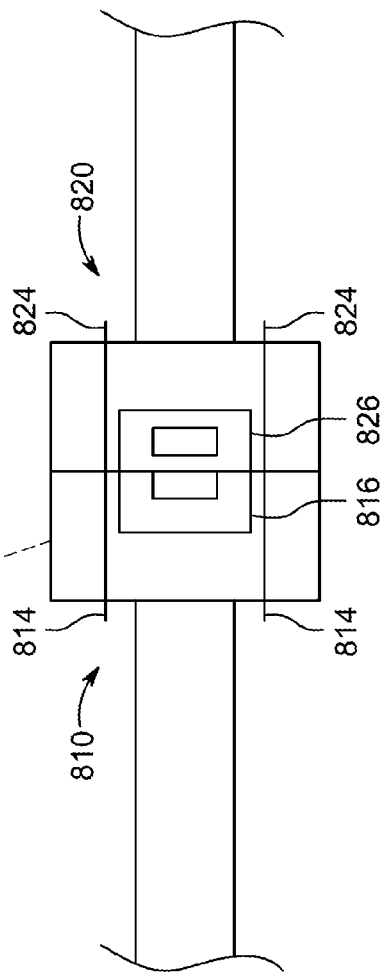

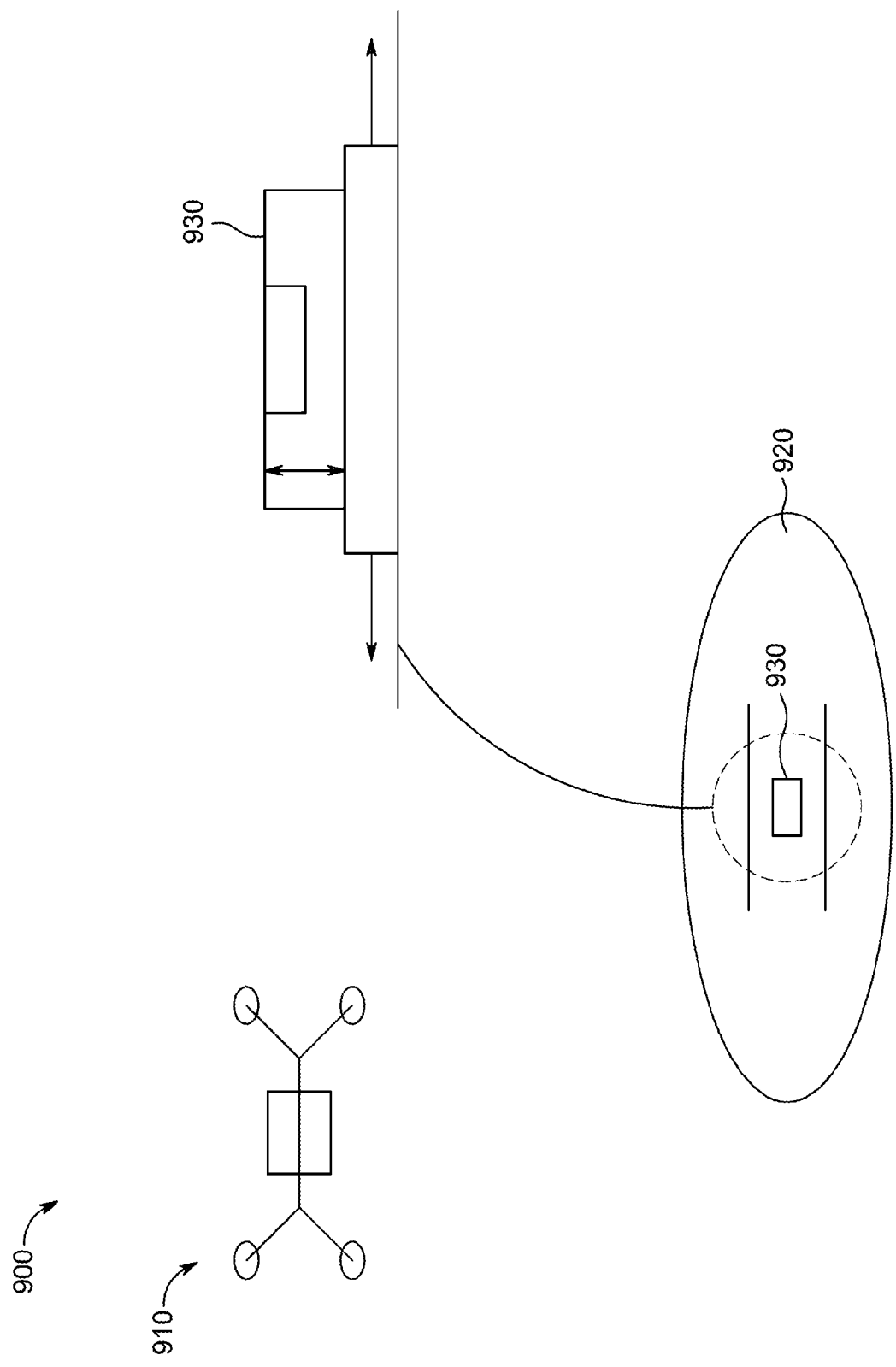

MULTIPLE ORDER CONNECTORS FOR CONTACTLESS COMMUNICATION DEVICES AND METHODS FOR USING THE SAME

FIELD OF THE INVENTION

The present disclosure relates to connectors for devices that use contactless communication units and more specifically to systems and methods for using multiple order connectors to optimally align contactless communications units between devices.

BACKGROUND

Advances in semiconductor manufacturing and circuit design technologies have enabled the development and production of integrated circuits (ICs) with increasingly higher operational frequencies. In turn, electronic products and systems incorporating such integrated circuits are able to provide much greater functionality than previous generations of products. This additional functionality has generally included the processing of increasingly larger amounts of data at increasingly higher speeds. Systems or devices that rely on these high-speed ICs to conduct contactless communications require the ICs to be aligned within predetermined parameters in order to properly function and operate at optimal performance. Accordingly, what is needed are alignment systems and methods to ensure the ICs are properly aligned.

BRIEF SUMMARY

Multiple order connectors for contactless communication devices and methods for using the same are disclosed herein. In some embodiments, a first device for use in establishing a contactless communications link with a second device is provided. The first device can include a first order connection and a second order connection. The first order connection can be constructed to interface with a counterpart first order connection of the second device. The second order connection can include a substrate, at least one contactless communications unit (CCU) mounted on the substrate and that is operative to establish the contactless communications link with a respective counterpart CCU of the second device, and an actuator operative to move the substrate such that the at least one CCU is optimally aligned with its respective counterpart CCU to establish the contactless communications link.

In another embodiment, a method for using multiple orders of connections to align at least one coupled pair of CCUs is provided. A first CCU of the coupled pair is associated with a first device and a second CCU of the coupled pair is associated with a second device. The method can be implemented in the first device and can include establishing a first order connection with the second device and, subsequent to establishment of the first order connection, performing a second order connection with the second device, wherein the performing of the second order connection comprises moving the first CCU relative to the second CCU such that the coupled pair is optimally aligned for conducting contactless communications.

BRIEF DESCRIPTION THE DRAWINGS

Having thus described communication between devices in general terms, reference is now made to the accompanying drawings, which are not necessarily drawn to scale, and wherein:

FIGS. 2A-2F show different views of illustrative devices having a second order connection according to various embodiments;

FIGS. 3A and 3B show illustrative top and side views of a second order connection having a screw-drive actuator, according to an embodiment;

FIGS. 8A and 8B show an illustrative under water industrial application that can use first and second order connections, according to an embodiment;

FIG. 9 shows illustrative drone landing system, according to an embodiment;

DETAILED DESCRIPTION

Figure 1:
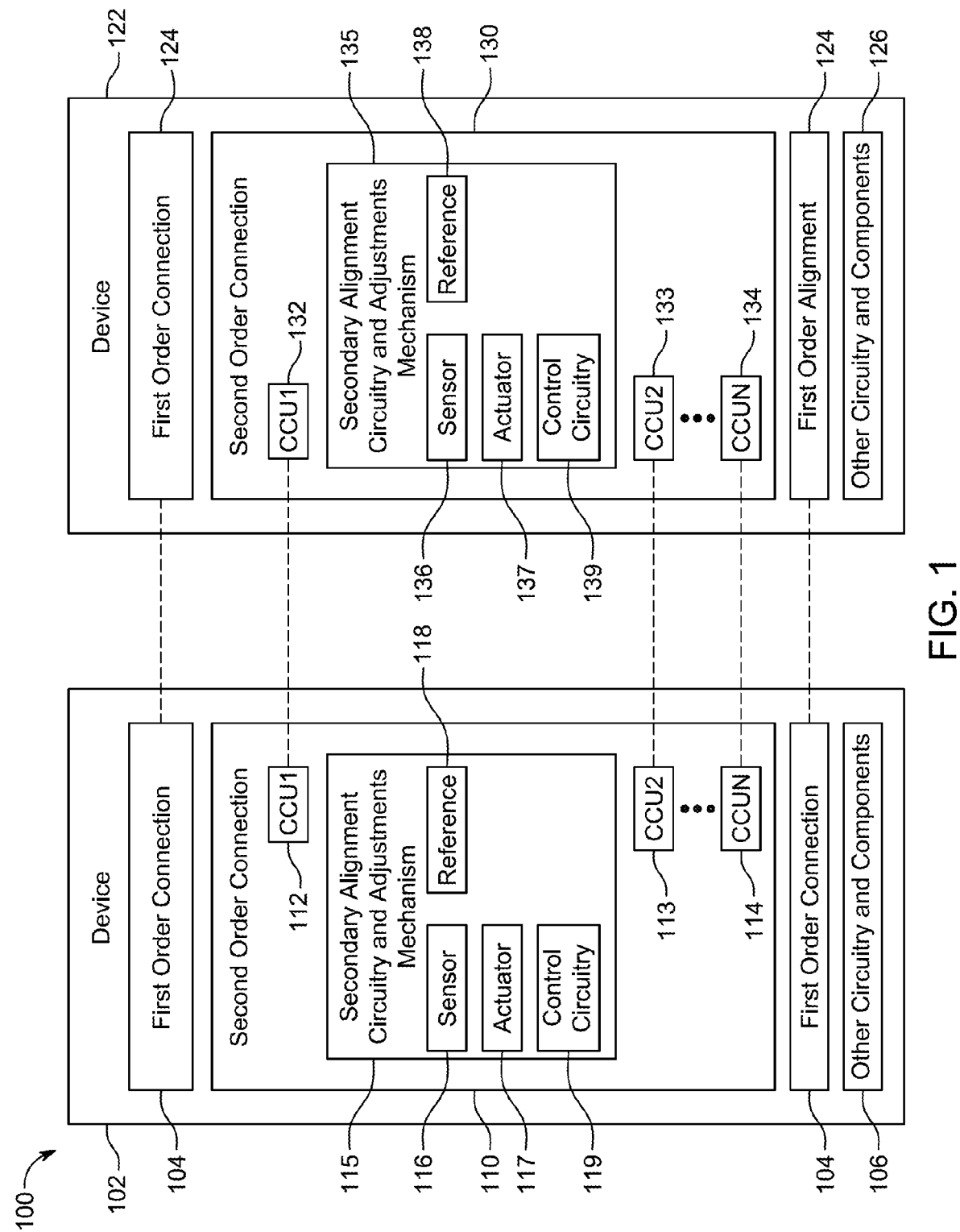
FIG. 1 illustrates an embodiment of a communication system.

Illustrative embodiments are now described more fully hereinafter with reference to the accompanying drawings, in which representative examples are shown. Indeed, the disclosed communication system and method may be embodied in many different forms and should not be construed as limited to the embodiments set forth herein. Like numbers refer to like elements throughout.

In the following detailed description, for purposes of explanation, numerous specific details are set forth to provide a thorough understanding of the various embodiments. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming but would nevertheless be a routine engineering undertaking for those of ordinary skill in the art having the benefit of this disclosure.

In today's society and ubiquitous computing environment, high-bandwidth modular and portable electronic devices are being used increasingly. Security and stability of communication between and within these devices is important to their operation. In order to provide improved secure high-bandwidth communications, the unique capabilities of wireless communication between electronic devices and between sub-circuits within each device may be utilized in innovative and useful arrangements.

Such communication may occur between RF communication units, and communication at very close distances may be achieved using EHF frequencies (typically, 30-300 GHz) in an EHF communication unit. An example of an EHF communications unit is an EHF comm-link chip. Throughout this disclosure, the terms contactless communication unit (CCU), comm-link chip, and comm-link chip package are used to refer to EHF antennas embedded in IC packages. CCUs may be capable of contactlessly communicating data in the EHF frequency. CCUs may be capable of either transmitting data, receiving data, or both. For ease of reference herein, a CCTU may refer to a CCU that is configured to transmit data, and a CCRU may refer to a CCU that is configured to receive data. A CCTU may be paired with a CCRU to form a coupled pair, in which data is contactlessly transmitted from the CCTU (which is associated with a first device) to the CCRU (which is associated with a second device).

The term "transceiver" may refer to a device such as an integrated circuit (IC) including a transmitter and a receiver so that the integrated circuit may be used to both transmit and receive information, such as data. Generally, a transceiver may be operable in a half-duplex mode (alternating between transmitting and receiving), a full-duplex mode (transmitting and receiving simultaneously), or configured as either a transmitter or a receiver. A transceiver may include separate integrated circuits for transmit and receive functions. The terms "contactless," "coupled pair," and "close proximity coupling" as used herein, refer to the implementing electromagnetic rather than electrical (wired, contact-based) connections and transport of signals between entities (such as devices). As used herein, the term "contactless" may refer to a carrier-assisted, dielectric coupling system which may have an optimal range dependent on several factors such as RF power, antenna design, RF channel design, and use of waveguides. In some embodiments, the range may be between zero to five centimeters without use of a waveguide. The connection may be validated by proximity of one device to a second device. Multiple contactless transmitters and receivers may occupy a small space. A contactless link established with electromagnetics may be point-to point in contrast with a wireless link which typically broadcasts to several points.

The RF energy output by the EHF transceivers described herein may be designed to adhere to various requirements mandated by one or more governments or their agencies. For example, the FCC may promulgate requirements for certification for transmitting data in a RF frequency band.

FIG. 1 illustrates a communication system 100. As shown, system 100 may include first device 102 configured to couple to second device 122. First device 102 may be configured to communicate with and/or connect to second device 122 and vice versa. Further, first device 102 and second device 122 can be electronic devices capable of connecting and communicating with each other. First device 102 may include first order connection 104, other circuitry and components 106, and second order connection 110. Similarly, second device 122 may include first order connection 124, other circuitry and components 126, and second order connection 130.

First order connections 104 and 124 represent a first stage of establishing a contactless link between coupled pairs of CCUs. Each device can include one or more instances of first order connections. As shown in FIG. 1, each device includes two instances of first order connections. First order connections 104 and 124 may be primarily responsible for mating devices 102 and 122 together. Any suitable mating and/or connection mechanisms can be used. For example, mechanical interface connectors, magnetic connectors, electro-magnetic connectors, docking connectors, and any combination thereof may be used to secure devices 102 and 122 together. As another example, merely placing devices 102 and 122 in close proximity of each other may be sufficient for establishing a contactless communications link.

When devices 102 and 122 are connected together via first order connections 104 and 124, there is generally an expectation that devices 102 and 122 can communicate with each other via their respective CCUs. For example, when devices 102 and 122 are connected together, CCU 112 may be sufficiently aligned with counterpart CCU 132, and CCU 113 may be sufficiently aligned with counterpart CCU 133, and any other device 102's CCUs may be aligned with their counterpart CCUs in device 122. Relatively sufficient alignment of coupled pairs of CCUs may be required to ensure optimal performance of the contactless link, as out of alignment CCUs may result in excessive power consumption, data loss, cross-talk, and undesired RF emissions. Ensuring that coupled pairs of CCUs are sufficiently aligned can be complicated by several different factors. For example, the ERF signal energy emitted by a CCU has a tendency to disperse in unrestrained free space. As a result, the CCUs are designed to project their signal energy in a particular direction. In addition, structures such as EHF conduits may be used to further assist the CCUs in containing and directing EHF signal energy. However, if the CCUs are not aligned, the CCU specific design and supporting structures may not be able to adequately compensate for the non-alignment. Another factor that can contribute to misalignment among coupled pairs of CCUs can be caused by device stackup variations that can exist during the construction of device 102 or device 122. That is, due to tolerance variations of components and variations in the placement thereof within a device, this may make it difficult for attaining desired alignment between coupled pairs of CCUs when devices 102 and 122 are connected via first order connections 104 and 124. Yet another factor that may affect alignment is an alignment disturb event that occurs after devices 102 and 122 are connected together via first order connections 104 and 124 and their respective CCUs are sufficiently aligned, but the alignment disturb event causes one or more coupled pairs of CCUs to fall out alignment.

Second order connections 110 and 130 according to embodiments discussed herein can provide a supplemental alignment ability to the first order connection to ensure coupled pairs of CCUs are aligned. If the first order connection can be considered to be a coarse adjustment mechanism for aligning CCUs, the second order connection can be considered to be a fine adjustment mechanism for aligning CCUs. Thus, the first order connection can be used to connect devices 102 and 122 together and establish a relatively rough alignment among CCUs, and the second order connection can adjust the alignment between the CCUs, if necessary, to establish a finished alignment. Second order connections 110 and/or 130 can perform secondary alignment any time after the first order connection has been made.

Second order connection 110 can include CCUs 112-114, though any suitable number of CCUs may exist, and secondary alignment circuitry and adjustment mechanism 115. Secondary alignment circuitry and adjustment mechanism 115 can include sensor 116, actuator 117, reference 118, and/or control circuitry 119. Second order connection 130 can include CCUs 132-134, though any suitable number of CCUs may exist, and secondary alignment circuitry and adjustment mechanism 135. Secondary alignment circuitry and adjustment mechanism 135 can include sensor 136, actuator 137, reference 138, and/or control circuitry 139. Although system 100 shows both devices 102 and 122 including second order connections 110 and 130, respectively, this is merely illustrative. In some embodiments, one of devices 102 and 122 may not include all the components of the second order connection and may have its CCUs permanently fixed in place within their respective device. In this embodiment, the device having the second order connection may be required to make the second order alignment adjustments with respect to the CCUs of the other device. For example, the device having permanently fixed CCUs may include a reference so that the device having the second order connection can align itself with respect to that reference. In embodiments where both devices include second order connections, one or both second order connections can adjust the alignment of its respective CCUs so that desired alignment is achieved.

The CCUs associated with second order connection 110 may be mounted to a substrate (e.g., a flexible circuit board or printed circuit board) that can be moved along at least one of multiple axes so that desired CCU alignment can be achieved. For example, in some embodiments, the substrate can be moved along just one axis (e.g., x-axis), two axes (e.g., x and y axes), or all three axes (e.g., x, y, and z axes). It should be noted that the positions of the CCUs (and the spacing between adjacent CCUs) on the substrate in a first device are substantially the same as the positions of the CCUs on a substrate in a second device. This ensures that CCUs will be aligned when one substrate is positioned with respect to the other.

Sensor 116 may be used by secondary alignment circuitry and adjustment mechanism 115 to determine a position of second order connection 110 relative to second order connection 130. Sensor 116 may work in conjunction with reference 138 of second order connection 135. For example, in one embodiment, sensor 116 may monitor the position of reference 138 to determine the relative locations of the second order connections. As a specific example, sensor 116 can be a photodetector and reference 138 can be a LED. As another specific example, sensor 116 can be a camera and reference 138 can be a distinguishing mark such as a dot or bullseye.

Sensor 116 may communicate positioning information with actuator 117 so that actuator 117 can move second order connection 110 in position so that it is aligned with second order connection 130. Actuator 117 may be operative to physically move second order connection 110 using any of variety of different platforms. For example, in one embodiment, actuator 117 may be a motorized platform, a magnetically oriented platform, an electromagnetically driven platform, a gimbal platform, a screw-drive platform, a pneumatic control platform, or any other platform that can move second order connection 110 along one or more axes.

Secondary alignment circuitry and adjustment mechanism 135, sensor 136, actuator 137, and reference 138 may be functionally the same as secondary alignment circuitry and adjustment mechanism 115, sensor 116, actuator 117, and reference 118. And as such, a duplicate discussion of these components will not be repeated.

Control circuitry 119 may coordinate or control operation of one or more of sensor 116, reference 118, and actuator 117 to align CCUs of device 102 with the CCUs of device 122. In some embodiments, control circuitry 119 can communicate with CCUs 112-114 when assessing whether the second order connection should be moved to better align with the second order connection of device 122. That is, control circuitry 119 can use sensor 116, reference 118 (or counterpart reference 138), and CCUs 112-114 to determine how best to align second order connection 110 with respect to second order connection 130. For example, control circuitry 119 may be configured for determining whether an electromagnetic EHF signal received by one of CCUs 112-114 indicates that the second order alignment connections 110 and 130 are in alignment. Further, control circuitry 119 may be configured to produce one or more modulation signals, and in one embodiment, control circuitry 119 may generate a modulated electromagnetic EHF signal when the received electromagnetic EHF signal indicates that second order connections 110 and 130 are in alignment. In another embodiment, control circuitry 119 may disable transmission of a modulated electromagnetic EHF signal between devices 102 and 104 when the received electromagnetic EHF signal indicates that second order connections 110 and 130 are not in alignment.

Control circuitry of one of the devices may be configured to modulate an output or transmit an electromagnetic EHF signal contingent on meeting one or more predefined criteria. For example, the one or more predefined criteria may include matching at least one of a first data pattern, a first data rate, a first bit-error rate, and a first protocol of first device 102 with a corresponding second data pattern, a second data rate, a second bit-error rate, and a second protocol of second device 122. The one or more predefined criteria may include determining if strength of the received electromagnetic EHF signal is greater than a predefined threshold for a predefined time period. In an embodiment, control circuitry 119 may determine if strength of the received electromagnetic EHF signal is greater than a predefined threshold for a predefined time duration. In some examples, the one or more predefined criteria or determination of whether the second order connections are aligned may include detecting impedance of at least one of a first antenna of first device 102 and/or a second antenna of second device 122. In some embodiments, the control circuitry 119 may detect impedance of at least one of the first antenna and the second antenna. In some examples, the one or more predefined criteria may include determining and analyzing a time-of-flight for a round-trip EHF signal, i.e., for an electromagnetic EHF signal transmitted from one device to the other device and retransmitted back to the one device. Control circuitry 119 may be configured to determine whether the received electromagnetic EHF signal indicates that the second order connections 110 and 130 are in alignment. Further, the CCUs may be configured to transmit modulated signals between the devices when the second order connections 110 and 130 are in alignment.

In some embodiments, control circuitry 119 may determine whether the other device is an acceptable or compatible device for communication. For example, control circuitry 119 may determine whether an unlock code transmitted by the other device is an acceptable unlock code. Control circuitry 119 may be configured to determine whether the electromagnetic EHF signal received from the other device is modulated with data formatted according to an acceptable qualification pattern.

In some embodiments, control circuitry 119 may detect that the second order connection has fallen out of alignment, even though it was previously in alignment. In response to this determination, control circuitry may activate one or more of sensor 116, reference 118 (and/or reference 138) to reposition second order connection 110 relative to second order connection 130.

Other circuitry and components 106 and 126 may represent other circuitry and components that may exist in devices 102 and 122. For example, other circuitry 106 and 126 can each include a signal controller (not shown) that may be configured to communicate with the CCUs 112-114 and CCUs 132-134. First and second devices 102 and 122 may be configured as peers and have corresponding functionality, or they may be configured as host and client with different functionality. In one example, the signal controller (not shown) may perform one or more checks to authorize communication between the first device 102 and the second device 122. Further, the signal controller may determine whether second device 122 is an acceptable device when connected to first device 102. Circuitry 106 may analyze the one or more signals received from the second device 122, such as from CCU 132 and/or CCU 133. Circuitry 126 of second device 122 may analyze and/or process the electromagnetic signals received from first device 102 or more specifically from CCU 112 and/or 113.

Components 106 can include a shield portion that is designed to interface with a counterpart shield portion included in circuitry and components 126 to provide electromagnetic shielding. This way, when devices 102 and 122 are connected, the shield portions can interface with each other to form an EHF shield that prevents or mitigates EHF leakage when devices 102 and 122 are contactlessly communicating with each other. The shield portions of both devices may be configured to effectively connect to each other, thus acting as a continuous shield portion rather than two separated shield portions, when the first device 102 and the second device 104 are aligned properly and preferably positioned proximate to or in contact with each other. Additionally, circuitry 106 may further be configured for determining whether the shield portion of device 102 is in effective electrical contact with the shield portion of device 122, sufficiently to form a continuous shield when the shield portions are aligned relative to each other and preferably positioned proximate to or in contact with each other. In some embodiments, the first order connection may be sufficient for establishing the continuous shield. In another embodiment, the second order connection may be used to establish the continuous shield.

Figure 2E:
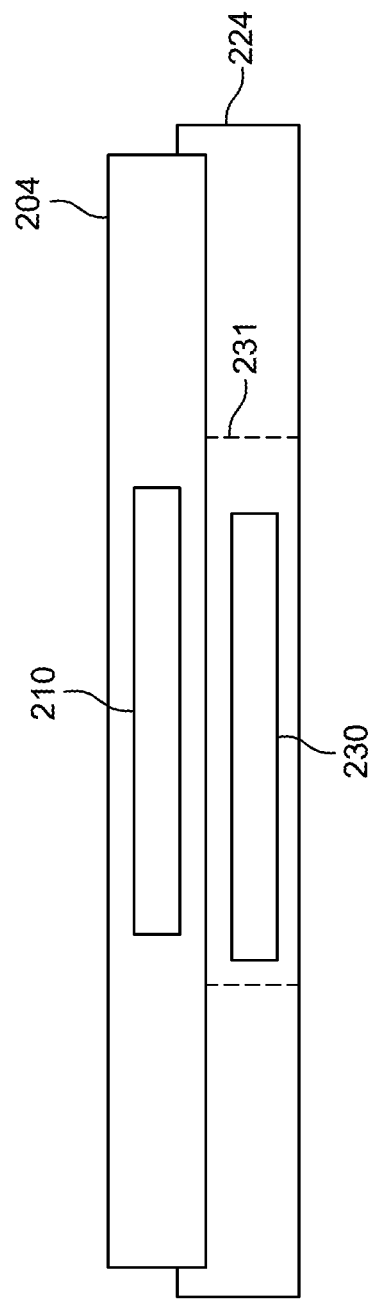

FIGS. 2A-2F show different views of illustrative devices 202 and 222 having second order connection according to various embodiments. In particular, FIGS. 2A and 2B show illustrative top and side views, respectively, of device 202. FIGS. 2C and 2D show illustrative top and side views, respectively, of device 222. FIGS. 2E and 2F show illustrative side views of devices 202 and 222 connected together. As shown in FIGS. 2A and 2B, device 202 can include first order connection 204 and second order connection 210. First order connection 204 may be constructed to fit into a corresponding first order connection of device 222. Second order connection 210 is fixed in a permanent position and includes CCUs 212 and 214, and reference 218. Because second order connection 210 is fixed in position, the second order connection of device 222 will be responsible for aligning itself with respect to second order connection 210. It should be understood that this is merely illustrative and that second order connection 210 can be moveable. As shown in FIGS. 2C and 2D, device 222 can include first order connection 224 and second order connection 230. First order connection 224 may be constructed to interface with first order connection 204 of device 202. Second order connection 230 may move within float zone 231 and can include CCUs 232 and 234 and secondary alignment circuitry and adjustment mechanism 235. Float zone 231 may represent the free space in which second order connector 230 can move within in order to align with second order connector 210. Second order connector 230 can move in one to three different axes.

FIG. 2E shows devices 202 and 222 are connected together via first order connections 204 and 224 such that connection 204 is inserted within connection 224. However, second order connections 210 and 230 are not aligned. Second order connection 230 can use its secondary alignment circuitry and adjustment mechanism 235 to align itself with respect to second order connection 210. For example, secondary alignment circuitry and adjustment mechanism 235 can monitor the location of reference 218 to determine how much to move second order connection 230 in order to ensure the CCUs of both devices are optimally aligned. The result of such movement is shown in FIG. 2F.

FIGS. 3A and 3B show illustrative top and side views of a second order connection 300 having a screw-drive actuator, according to an embodiment. The screw-drive actuator of FIGS. 3A and 3B may perform the physical alignment of second order connection as discussed above in connection with actuator 117 of FIG. 1. Connection 300 shows substrate 310 connected to screw-drives 321-326, which can position substrate 310 anywhere within free space 330. Substrate 310 may be a platform in which CCUs are mounted. For example, substrate 310 can be a rigid printed circuit board or a flexible printed circuit board. Screw-drives 321-326 may be arranged to provide movement along multiple axes. For example, screw-drives 321 and 322 may coordinate their operation to move substrate 310 along the Y-axis, screw-drives 323 and 324 may control X-axis movement, and screw-drives 325 and 326 may control Z-axis movement. In some embodiments, only one screw-drive may be needed to control movement along any given axis. In other embodiments, only one axis movement may be required, or only two axis movements may be required.

Each screw-drive may include a driver (e.g., shown as driver 340) that is secured at or near a boundary of free space 330 and a screw (e.g., shown as screw 341) that is moveably coupled to the driver and substrate 310. The driver can cause the screw to rotate clockwise or counter clockwise in order to move substrate 310 in a desired direction. For example, if substrate 310 is to be moved from left to right, screw-drive 324 may drive its screw to extend and screw-drive 323 may drive its screw to retract. The extension of screw-drive 324 may approximately the same as the retraction of screw-drive 323 so that no unnecessary stress is imparted to substrate 310. In some embodiments, each of screw-drives 321-326 may include a multi-axis pivot (not shown) that enables the screws to accommodate changes in position of substrate 310. For example, if substrate 310 moves in the Y-axis direction, screw-drives 323 and 324 may pivot in the x-y plane to accommodate the movement of substrate. Similarly, if substrate 310 moves in the Z-axis direction, screw-drives 323 and 324 may pivot in the x-z plane to accommodate that movement.

Figure 4:
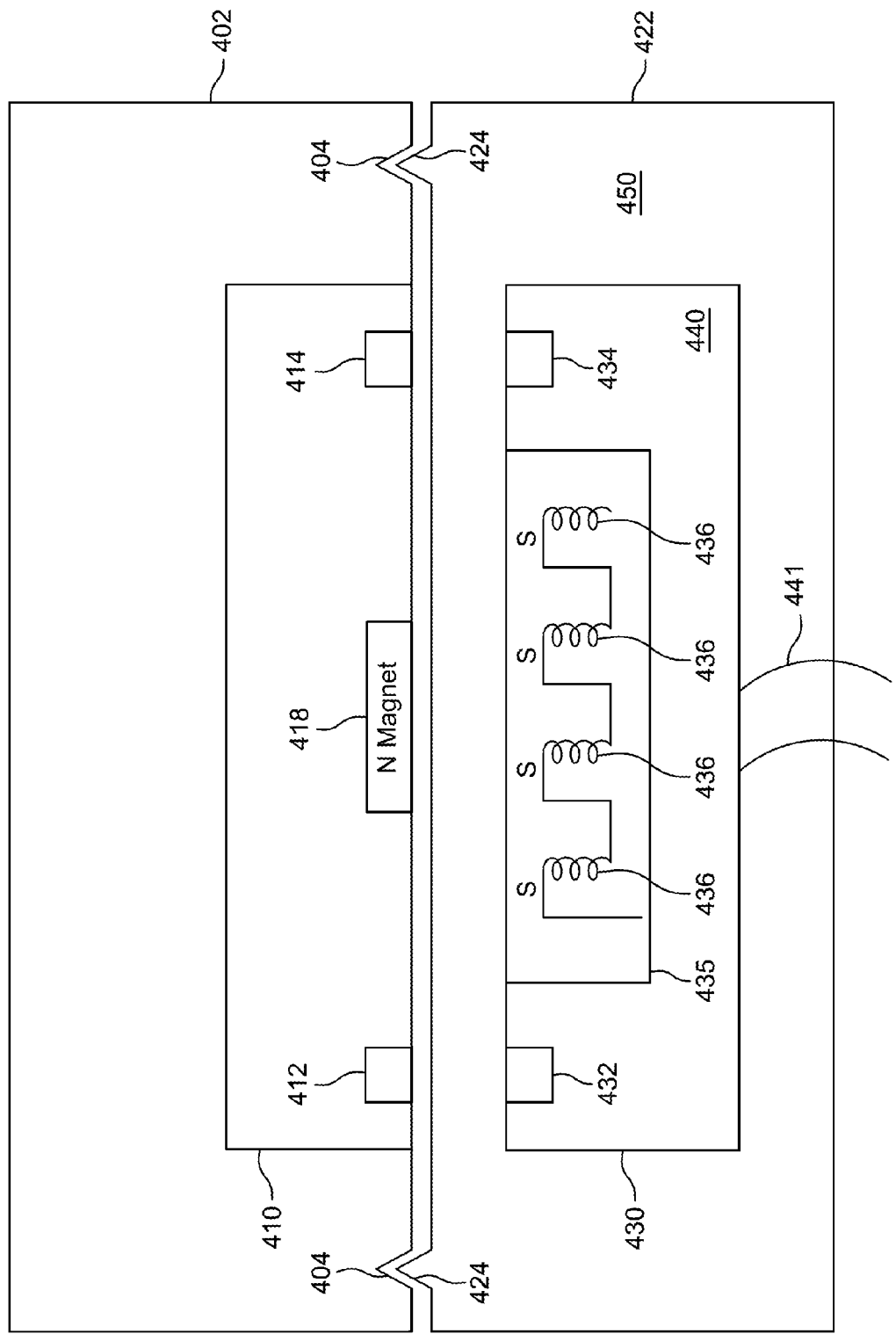
FIG. 4 shows an illustrative cross-sectional view of two connected devices each having second order connections according to an embodiment.

FIG. 4 shows an illustrative cross-sectional view of two connected devices each having second order connections according to an embodiment. As shown, device 402 can include first order connection 404 and second order connection 410. First order connection 404 can have, for example, female receptacles for receiving counterpart male receptacles. Second order connection 410 can include CCUs 412 and 414 and permanent magnet 418. In the embodiment shown and described here, second order connection 410 may be permanently fixed in position, and the second order connection of device 422 may move to align itself with respect to second order connection 410.

Device 422 can include first order connection 424 that interfaces with first order connection 404 of device 402 to connected devices 402 and 422 together. Device 422 can also include second order connection 430 that has CCUs 432 and 434 mounted on substrate 440. Substrate 440 may be a flexible circuit board that has flex cable 441 attached thereto and is sufficiently flexible to enable substrate 440 to move around free space 450. Second order connection 430 can include electromagnetic actuator 435 that is operative to align substrate 440 with respect to second order connection 410.

Electromagnetic actuator 435 can include one or more discrete electromagnetics 436 that can be selectively turned ON and OFF. Moreover, the power applied to each discrete electromagnet 436 can be controlled such that the magnetism level of each electromagnet can be controlled. Control circuitry (not shown) can control application of power to each electromagnetic 436 so that the appropriate magnetic field is produced to interact with permanent magnet 418, which may have a polarity opposite of that produced by electromagnet actuator 435. For example, if substrate 440 is too far to the left, control circuitry can adjust the magnetic fields being produced by electromagnets 436 to move substrate 440 to the right so that it is aligned with second order connection 410. It should be appreciated that although, electromagnetic actuator 435 is shown and described to move substrate 440 along just one axis, actuator 435 can be designed and constructed to move substrate 440 along two or more axes.

Figure 5:
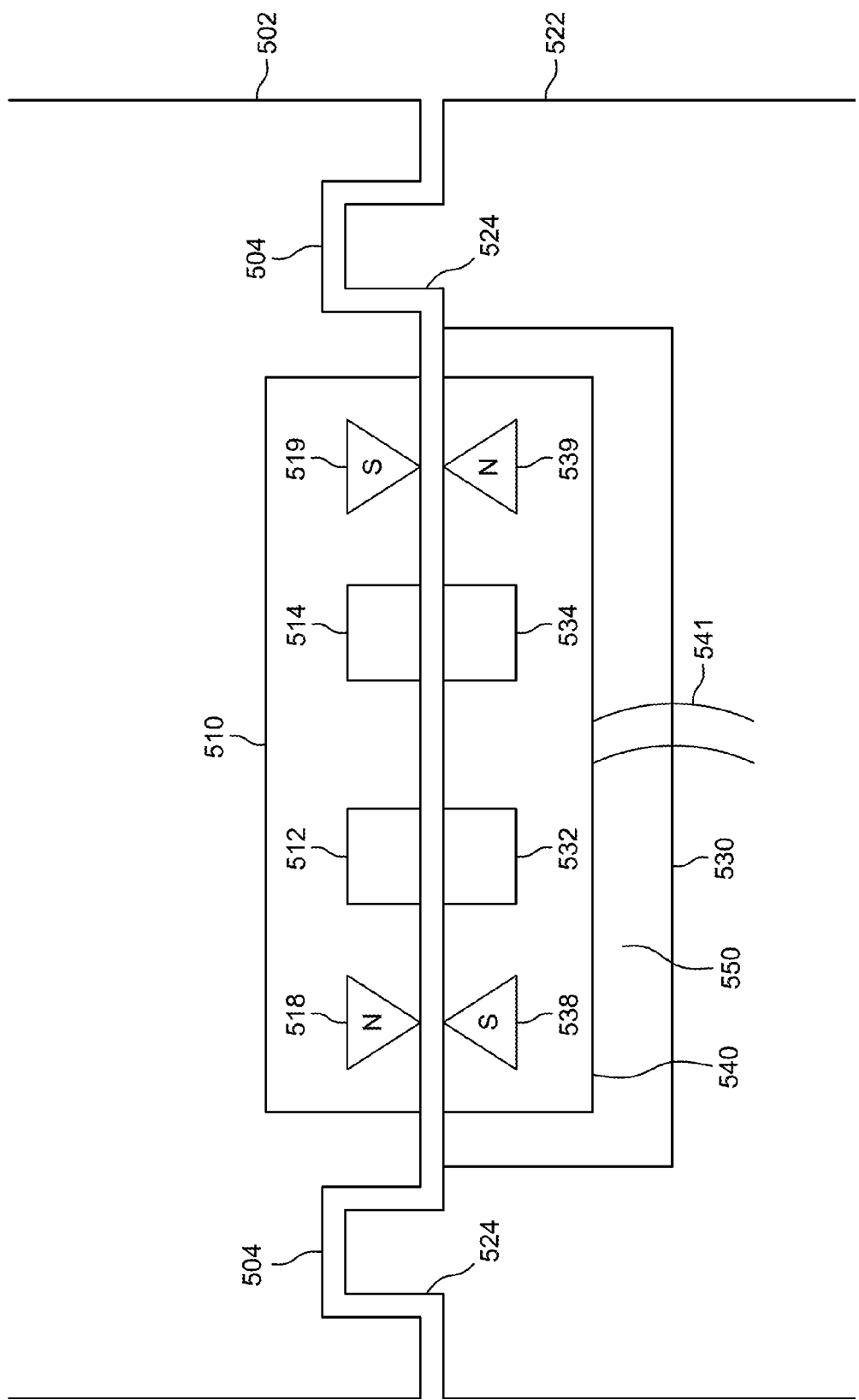
FIG. 5 shows another illustrative cross-sectional view of two connected devices each having second order connections according to an embodiment.

FIG. 5 shows an illustrative cross-sectional view of two connected devices each having second order connections according to an embodiment. As shown, device 502 can include first order connection 504 and second order connection 510. First order connection 504 can have, for example, female receptacles for receiving counterpart male receptacles. Second order connection 510 can include CCUs 512 and 514 and permanent magnets 518 and 519. In the embodiment shown and described here, second order connection 510 may be permanently fixed in position, and the second order connection of device 522 may move to align itself with respect to second order connection 510. Device 522 can include first order connection 524 that interfaces with first order connection 504 of device 502 when devices 502 and 522 are connected together. Device 522 can also include second order connection 530 that has CCUs 532 and 534 mounted on substrate 540. Substrate 534 may be a flexible circuit board that has flex cable 541 attached thereto and is sufficiently flexible to enable substrate 540 to move around free space 550. Second order connection 530 can include permanent magnets 538 and 539 that are designed to self-align with counterpart permanent magnetics 518 and 519. For example, magnets 518 and 538 may self-align, and magnets 519 and 539 may self-align. If desired, additional magnetics may be included in second order connections 510 and 530 to further assist the self-alignment of substrate 540.

In some embodiments, a combination of both permanent and electromagnetics can be used as part of an actuator platform that aligns second order connection to another second order connection. Such an embodiment may include features from the second order connections of FIGS. 4 and 5.

Figure 6:
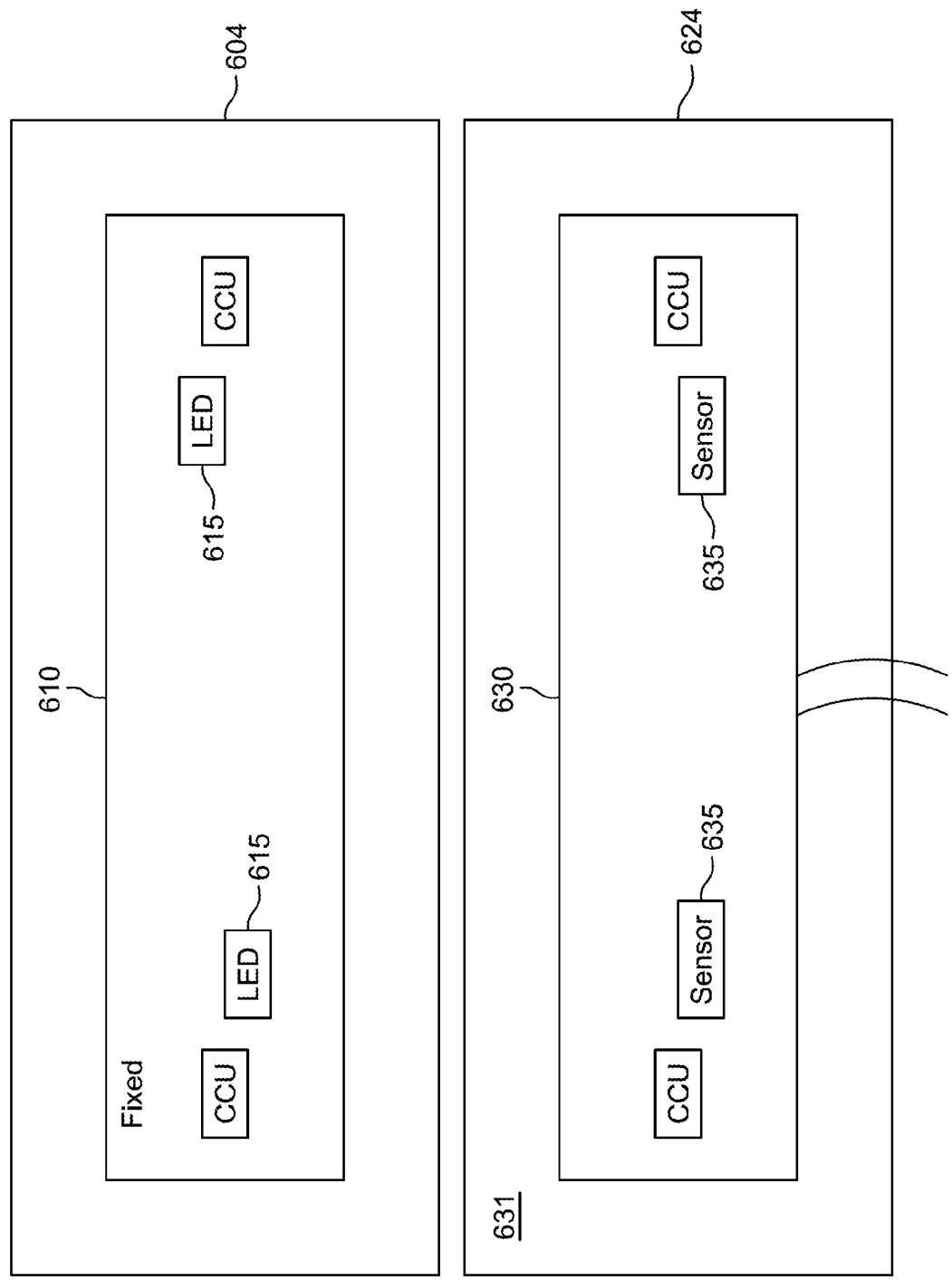
FIG. 6 shows an illustrative sensor and reference example that can be used in second order connections, according to an embodiment.

FIG. 6 shows an illustrative sensor and reference example that can be used in second order connections, according to an embodiment. Second order connection 610 can be fixed within first order connection 604 and can include one or more LEDs 615 that serve as beacons for one or more sensors 635 contained in second order connection 630. Second order connection 630 may be able to move within free space 631 via an actuator platform (not shown) of first order connection 624. Sensors 635 may monitor for the presence of the one or more LEDs 615 and provide feedback data to a controller (not shown) and/or actuator platform (not shown) so that second order connection 630 is optimally aligned with second order connection 610.

Figure 7:
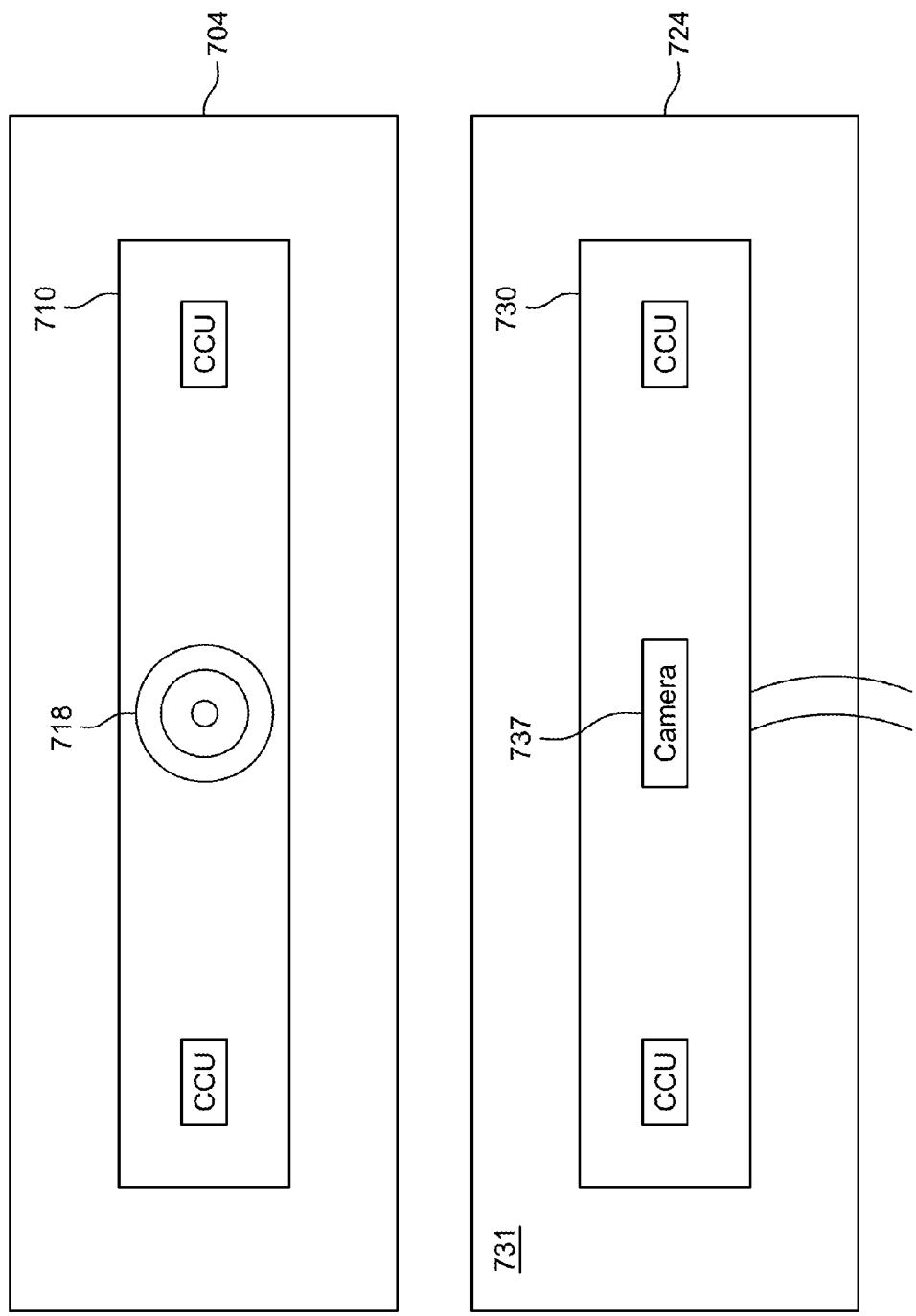
FIG. 7 shows another illustrative sensor and reference example that can be used in second order connections, according to an embodiment.

FIG. 7 shows another illustrative sensor and reference example that can be used in second order connections, according to an embodiment. Second order connection 710 can be fixed within first order connection 704 and can include reference point 718 that serve as a location beacon for sensor 737 contained in second order connection 730. Second order connection 730 may be able to move within free space 731 via an actuator platform (not shown) of first order connection 724. Sensor 737 may be a camera that monitors for the location of reference point 718 and can provide feedback data to a controller (not shown) and/or actuator platform (not shown) so that second order connection 730 is optimally aligned with second order connection 710. For example, if reference point 718 is a bullseye with a series of increasing diameter rings, sensor 737 can provide feedback to a controller, which in turn can instruct the actuator to move second order connection 730 in response to the rings being monitored by the sensor 737.

Various industrial applications may be a fertile environment for applications that use the second order connections according to various embodiments. Industrial applications, as opposed to consumer electronic applications, generally operate in a larger, bulkier, context and as a result, the ability to ensure CCUs are optimally aligned when two industrial sized devices/components are coupled together can be difficult. For example, industrial applications may require large machines to place two components together to achieve a first order connection. Use of such large equipment lacks the finesse that can be exercised by human hands, thereby potentially making it difficult to align the CCUs during the first order connection.

FIG. 8A shows an illustrative under water industrial application that can use first and second order connections according to an embodiment. As shown, underwater cable 800 may exist under body of water 802 and is being serviced by ship 804. Ship 804 may be performing any variety of actions that requires a first order coupling of two portions of cable 800. For example, ship 804 may be coupling two ends of separate cables or is splicing the cable to installation of additional equipment. Regardless of the operation, it may take place underwater using remote controlled equipment. The equipment may be capable of establishing a first order connection between two portions of cable 800, but is too bulky to ensure alignment of CCUs is ensured. Referring now to FIG. 8B, an enlarged illustrative cross-section of cable 800 is shown. In particular, first order connections 814 and 824 are shown coupling cable portions 810 and 820 together. In addition, portions 810 and 820 can include second order connections 816 and 826, respectively. Second order connections 816 and 826 may each have the ability self-align with respect to each other using the embodiments taught herein.

FIG. 9 shows illustrative drone landing system 900 that can include drone 910, landing pad 920, and data transfer platform 930. Drone 910 may perform various operations such as deliver packages, perform surveillance, take photos or videos, and execute various other missions. Drone 910 may land at landing pad 920 to receive data from and/or provide data to data transfer platform 930. When drone 910 lands on landing pad, it can establish a first order connection by landing on top of data transfer platform 930. After the first order connection is established, a second order connection according to embodiments discussed herein can align CCUs (not shown) contained in platform 930 with CCUs (not shown) in drone 910. After second order alignment is achieved, data can be transferred between drone 910 and data transfer platform 930.

Figure 10:
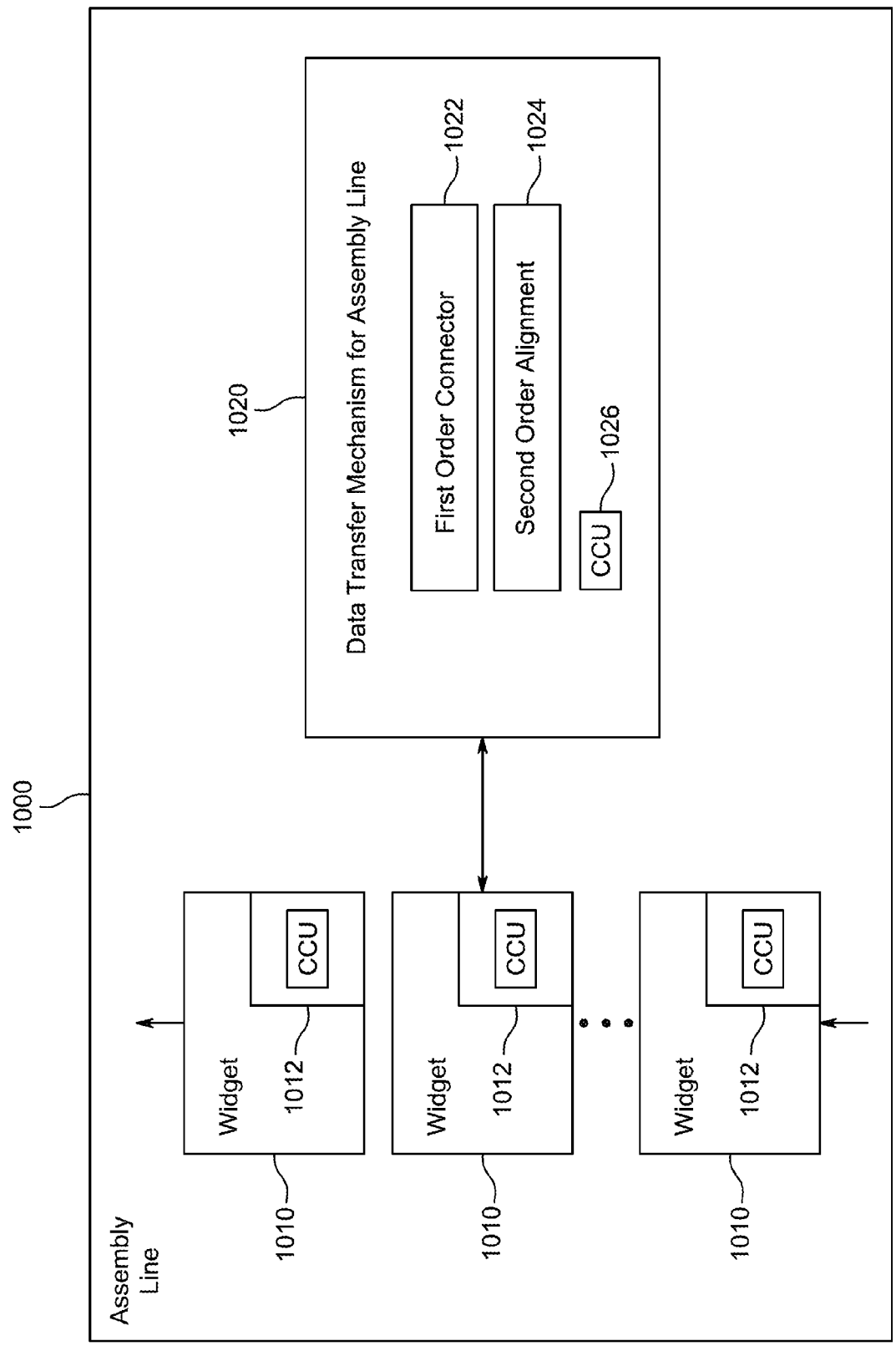
FIG. 10 shows an illustrative assembly line system, according to an embodiment.

FIG. 10 shows illustrative assembly line system 1000 that includes several widgets 1010 and data transfer mechanism 1020. Each widget 1010 may have a first order connection 1012 for interfacing with a corresponding first order connection 1022 of data transfer mechanism 1020. Each widget 1010 may also include one or more CCUs. Data transfer mechanism 1020 can include first order connection 1022, second order connection 1024, and one or more CCUs 1026. Second order connection 1024 can embody the features of second order connection 110 of FIG. 1. As widgets 1010 move along the assembly line, data transfer mechanism 1020 can establish a first order connection via connections 1012 and 1022. After the first order connection is made, second order alignment 1024 establishes a second order connection with the CCUs in widget 1010. After the second order connection is made, data can be transferred from data transfer mechanism 1020 to widget 1012.

Another industrial application that can benefit from second order connections according to embodiments discussed herein can include alignment of CCUs in outer space. For example, second order alignment may be used in satellite to satellite connections, space station to satellite connections, or any other connections performed in outer space.

Figure 11:
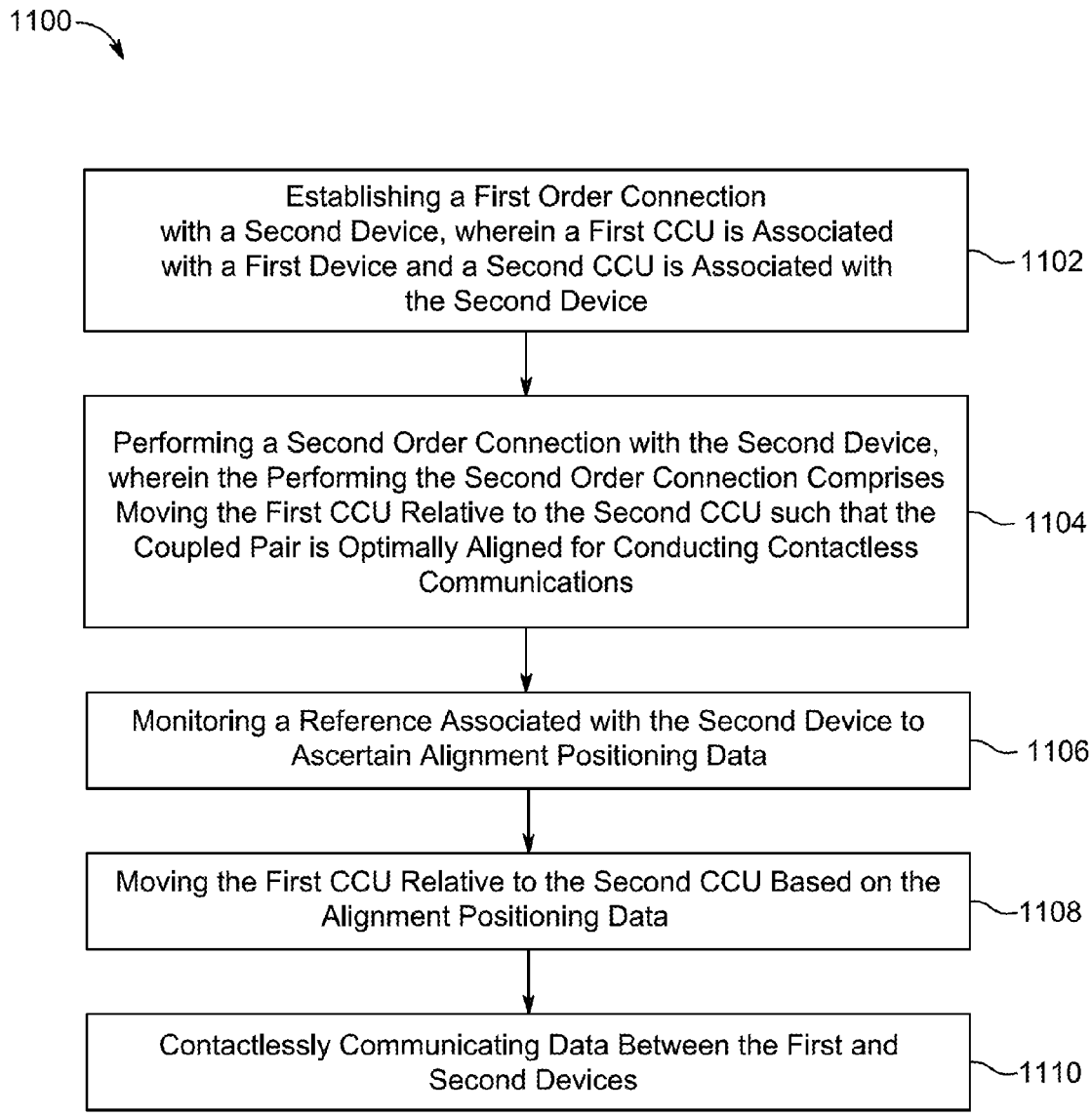
FIG. 11 shows an illustrative process for performing a multiple order connection, according to an embodiment.

FIG. 11 shows an illustrative process 1100 for performing a multiple order connection, according to an embodiment. Process 1100 can start at step 1102, where a first order connection can be established with a second device. That is, a first device is connected with the second device via the first order connection. A first CCU can be associated with the first device and a second CCU can be associated with the second device. The first and second CCUs may form a coupled pair that, when aligned, contactlessly communicate data between the first and second devices. At step 1104, a second order connection with the second device can be performed. Performance of the second order connection can include moving the first CCU relative to the second CCU such that the coupled pair is optimally aligned for conducting contactless communications. For example, the first CCU may be situated on a substrate that is moved within a free space by an actuator (e.g., actuator 117). In addition, performance of the second order connection can also include monitoring a reference associated with the second device to ascertain alignment positioning data (at step 1106) and moving the first CCU relative to the second CCU based on the alignment positioning data (at step 1108). For example, the reference can be reference 138 of FIG. 1 and the monitoring can be performed by sensor 116 of FIG. 1. After the second order connection is made and the first and second CCUs are aligned, data can be contactlessly communicated between the first and second devices (step 1110).

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. Each example defines an embodiment disclosed in the foregoing disclosure, but any one example does not necessarily encompass all features or combinations that may be eventually claimed. Where the description recites "a" or "a first" element or the equivalent thereof, such description includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically stated.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, reference to the details of the preferred embodiments is not intended to limit their scope.

What is claimed is:

1. A first device for use in establishing a contactless communications link with a second device, the first device comprising:
    a first order connection constructed to physically interface with a counterpart first order connection of the second device; and
    a second order connection operative to move independent of the first order connection, the second order connection comprising:
        a substrate;
        at least one contactless communications unit (CCU) mounted on the substrate and that is operative to establish the contactless communications link with a respective counterpart CCU of the second device; and
        an actuator operative to move the substrate such that the at least one CCU is optimally aligned with its respective counterpart CCU to establish the contactless communications link, wherein the first order connection is operative to perform coarse physical alignment of the at least one CCU with the respective counterpart CCU and wherein the second order connection is operative to perform fine physical alignment of the at least one CCU with the respective counterpart CCU.

2. The first device of claim 1, wherein the first order connection is insufficient for establishing the contactless communications link.

3. The first device of claim 1, wherein the second order connection further comprises:
    a sensor for detecting a reference existing on the second device, wherein the actuator moves the substrate based on data obtained from the sensor.

4. The first device of claim 3, wherein the sensor is a camera and the reference is a location reference.

5. The first device of claim 3, wherein the sensor is a photo sensor and the reference is a light emitting diode.

6. The first device of claim 1, wherein the actuator comprises at least one electromagnet.

7. The first device of claim 1, wherein the actuator comprises at least one screw-drive.

8. The first device of claim 1, wherein the actuator comprises at least one permanent magnet.

9. The first device of claim 1, wherein the substrate is a flexible circuit board that moves within a free space independent of the first order connection.

10. The first device of claim 1, wherein the first device is one of a consumer electronic device and an industrial device.

11. The method claim 10, further comprising:
monitoring an alignment status of the coupled pair of CCUs;
determining whether the alignment status is in a non-aligned status; and
if the alignment status is determined to be the non-aligned status, re-performing the second order connection with the second device.

12. The first device of claim 1, wherein the first device is an industrial device selected from an underwater cable, a data transfer platform for use with a drone, a data transfer platform for use in an assembly line, and a spacecraft.

13. A method for using multiple orders of connections to align at least one coupled pair of contactless communication units (CCUs), wherein a first CCU of the coupled pair is associated with a first device and a second CCU of the coupled pair is associated with a second device, the method implemented in the first device, the method comprising:
establishing a first order connection with the second device, wherein the first order connection is a physical connection that defines a coarse alignment of the first CCU relative to the second CCU; and
subsequent to establishment of the first order connection, performing a second order connection with the second device, wherein the performing the second order connection comprises moving the first CCU relative to the second CCU independent of the first order connection such that the coupled pair is optimally aligned for conducting contactless communications, wherein the second order connection defines a fine alignment of the first CCU relative to the second CCU.

14. The method of claim 13, wherein the performing further comprises:
monitoring a reference associated with the second device to ascertain alignment positioning data; and
moving the first CCU relative to the second CCU based on the alignment positioning data.

15. The method of claim 13, wherein the first order connection is equivalent to a coarse alignment and the second order connection is equivalent to a fine alignment.

16. The method of claim 13, wherein the moving comprises using a plurality of electromagnets to move the first CCU relative to the second CCU.

17. The method of claim 13, wherein the moving comprises using at least one screw-drive to move the first CCU relative to the second CCU.

18. A first device for use in establishing a contactless communications link with a second device, the second device comprising:
a first order connection constructed to physically interface with a counterpart first order connection of the first device; and
a second order connection comprising:
a substrate;
at least one contactless communications unit (CCU) mounted on the substrate and that is operative to establish the contactless communications link with a respective counterpart CCU of the first device; and
a reference operative to provide an alignment reference point for enabling the first device to align its counterpart CCU with the CCU associated with the second device, wherein the first order connection is operative to perform coarse physical alignment of the at least one CCU with the respective counterpart CCU and wherein the second order connection is operative to perform fine physical alignment of the at least one CCU with the respective counterpart CCU.

19. The device of claim 18, wherein the substrate is permanently fixed in position.

20. The device of claim 18, wherein the reference comprises a light emitting diode.

* * * * *